United States Patent [19]

Carré et al.

[11] Patent Number: 4,576,257

[45] Date of Patent: Mar. 18, 1986

[54] DISC BRAKE WITH REMOVABLE CALIPER REINFORCING ARM

[75] Inventors: Jean J. Carré, Le Raincy; Guy Meynier, Aulnay Sous Bois, both of France

[73] Assignee: Societe Anonyme D.B.A., Paris, France

[21] Appl. No.: 629,931

[22] Filed: Jul. 11, 1984

[30] Foreign Application Priority Data

Jul. 13, 1983 [FR] France ................................ 83 11664

[51] Int. Cl.$^4$ ............................................. F16D 55/00
[52] U.S. Cl. ............................. 188/73.32; 188/73.38; 188/73.39; 188/78.45; 188/73.47
[58] Field of Search ................. 188/71.1, 73.31, 73.32, 188/73.33, 73.34, 73.39, 73.43, 73.44, 73.45, 73.46, 73.47, 73.38

[56] References Cited

U.S. PATENT DOCUMENTS

| Re. 29,582 | 3/1978 | Brown | 188/73.46 X |
|---|---|---|---|
| 3,100,553 | 8/1963 | Butler | 188/73.47 F |
| 3,354,992 | 11/1967 | Cook et al. | 188/73.31 X |
| 3,532,192 | 10/1970 | Folk | 188/73.47 X |
| 3,602,328 | 8/1971 | Fannin et al. | 188/72.5 |
| 3,656,590 | 4/1972 | Newstead | 188/73.45 |
| 3,802,539 | 4/1974 | Thiele | 188/72.91 |
| 3,887,045 | 6/1975 | Dehoff et al. | 188/73.45 |
| 3,977,498 | 8/1976 | Ogawa | 188/73.45 |
| 4,061,209 | 12/1977 | Gee et al. | 188/73.45 X |
| 4,093,044 | 6/1978 | Unterberg | 188/73.45 |
| 4,476,962 | 10/1984 | Bofill | 188/71.1 |

FOREIGN PATENT DOCUMENTS

| 2742105 | 3/1979 | Fed. Rep. of Germany | 188/73.31 |
|---|---|---|---|
| 2120330 | 11/1983 | United Kingdom | 188/71.1 |

Primary Examiner—George E. A. Halvosa
Attorney, Agent, or Firm—Larry J. Palguta; Ken C. Decker

[57] ABSTRACT

The disc brake incorporates a caliper (28) formed of two axially opposed beams (38, 40) and of two arms which are circumferentially spaced and which define a radial opening for the mounting/removal of friction components (56–62). The caliper incorporates a third arm (64) lying above the opening and mounted, so as to hinge about a shaft (68), on one (40) of the beams, members (66, 76, 78) being provided to join rigidly the third arm to the other (38) beam. An assembly is provided, for example an eccentric assembly, in the region of the shaft (68), to join the third arm to the caliper recovering the manufacturing tolerances of the brake.

7 Claims, 9 Drawing Figures

FIG_1

FIG_2

FIG_3

FIG_6

FIG_4

FIG_5

FIG_7

FIG_8

FIG_9

DISC BRAKE WITH REMOVABLE CALIPER REINFORCING ARM

The subject of the invention is a disc brake, particularly for a motor vehicle.

The invention concerns more specifically a disc brake of the type incorporating a caliper astride a rotating assembly to be braked, the caliper being formed by two beams positioned on each side of the rotating assembly and by two circumferentially spaced arms passing over the periphery of the rotating assembly and joining the two beams to one another, the two arms and the said beams defining a radial opening for mounting and removing friction components.

A brake of this type is described in French Patent No. 77-34,537 published under the number 2,409,423. A disc brake is described in said patent incorporating a caliper formed by a beam positioned on one side of the disc and a second beam, incorporating a brake actuator, positioned on the other side of the disc. These two beams are joined by two arms, passing over the periphery of the disc, made in one piece with the first beam and screwed to the second beam. The two beams and the two arms define an opening allowing friction components to be placed in position on each side of the disc. However, this brake has the disadvantage of defining a large opening between the beams and the arms, which makes general reinforcement necessary so as to prevent excessive deformation when the brake actuator applies its axial force. In particular, if it is desired to increase the circumferential length of the friction components, the radial opening becoming longer and longer, the two beams are likely to bend under the force of the actuator, which either necessitates acceptance of poor wear of the friction components, associated with a large brake actuator piston travel, and therefore a long pedal travel, or considerable reinforcement of the beams so as to limit their bending, which causes a considerable increase in weight. This problem is particularly evident on disc brakes for heavy vehicles, in which the friction components are of a large size, and in which the forces developed by the brake actuators are very great. This problem is amplified further in heavy vehicles when multiple disc brakes are used in which the opening is not only large in the circumferential direction, but is also large in the axial direction.

The aim of the invention is to propose a disc brake of the type described above, in which the bending of the two beams is significantly limited without causing a significant increase in weight.

For this purpose, the invention proposes a disc brake of the type mentioned above, incorporating a third arm lying above the opening and mounted, so as to hinge about a shaft, on one of the said beams, and means for rigidly joining the third arm to the other beam of the caliper.

With this arrangement, it is still possible to withdraw radially the friction components without removing the caliper, and this is achieved by a simple and rapid action upon the third arm positioned above the opening.

Another aim of the invention consists of providing cooperating means carried by the caliper, and by the third arm, for rigidly joining the latter to the caliper and allowing the combined manufacturing tolerances present in the brake to be easily recovered in such a way as to position the third arm relative to the two beams without play.

A description follows, by way of examples which are not limiting, of two embodiments of the invention, with reference to the accompanying drawings, in which.

Figure 1:
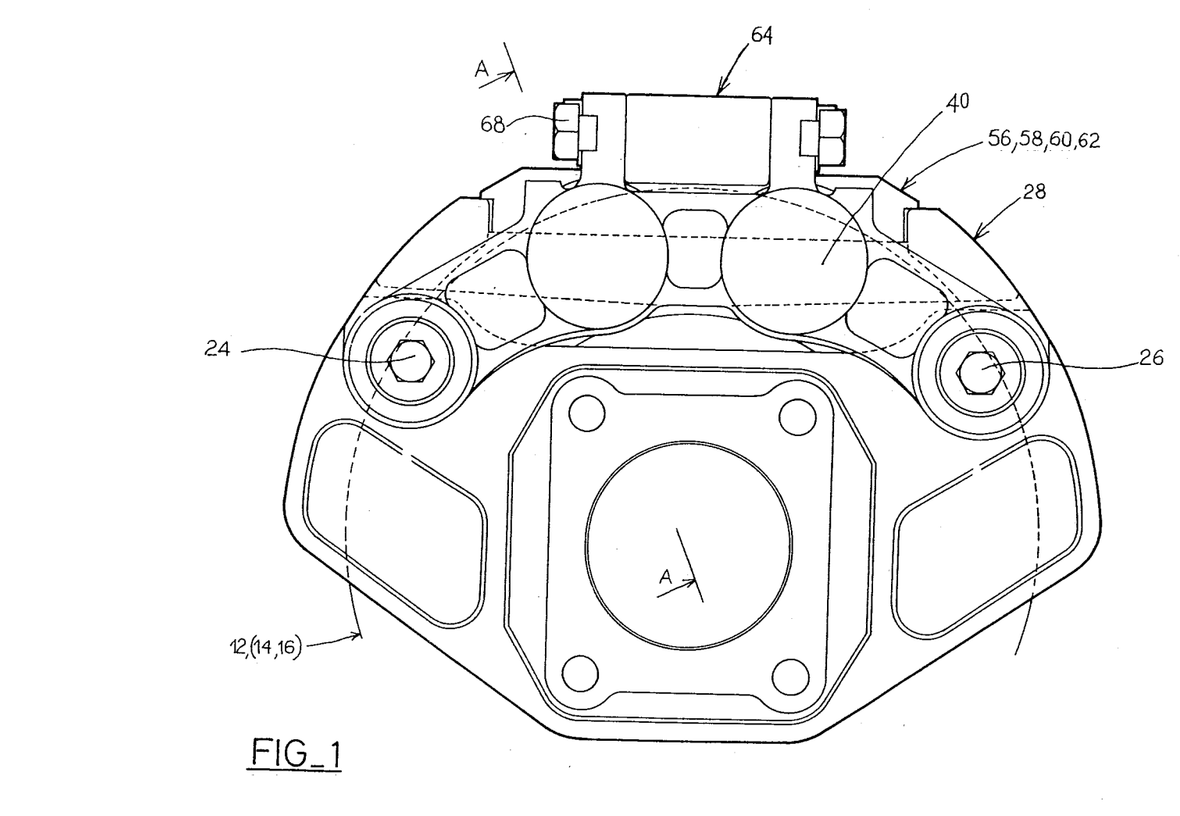
FIG. 1 is an end view of a disc brake constructed in accordance with the invention.
Figure 2:
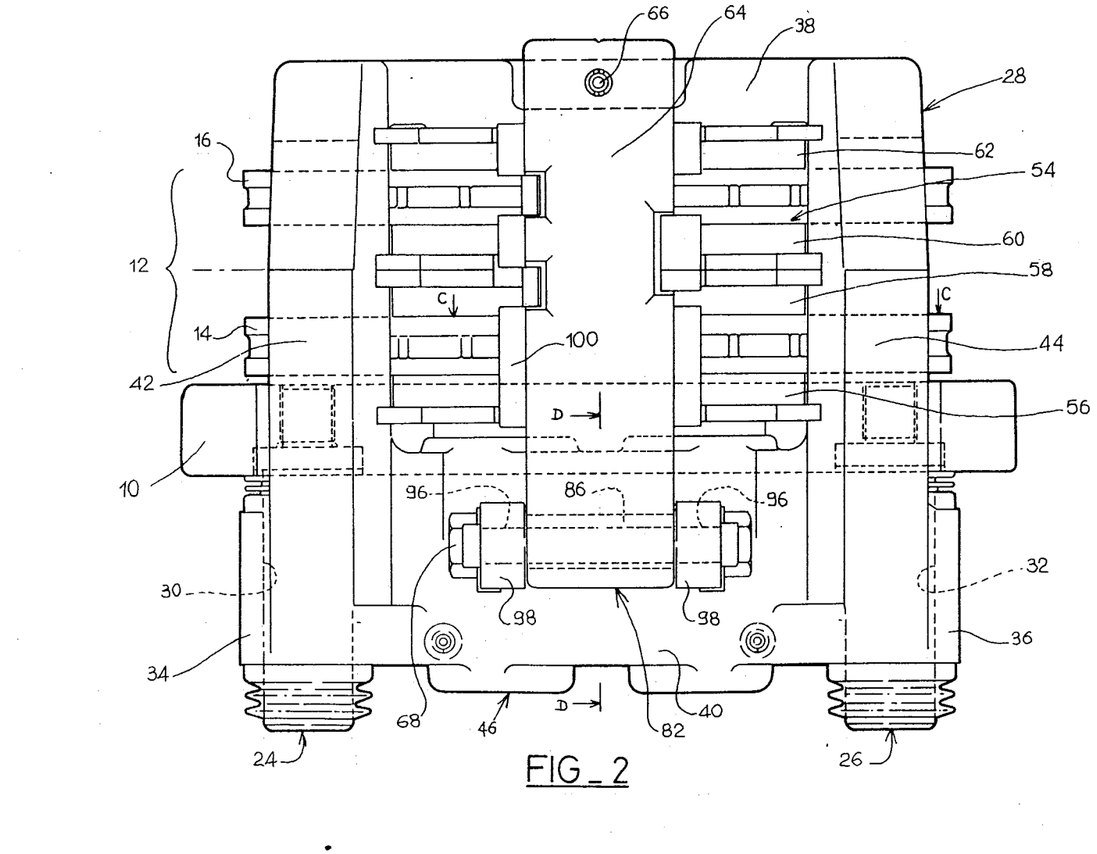
FIG. 2 is a plan view of the brake shown in FIG. 1.
Figure 3:
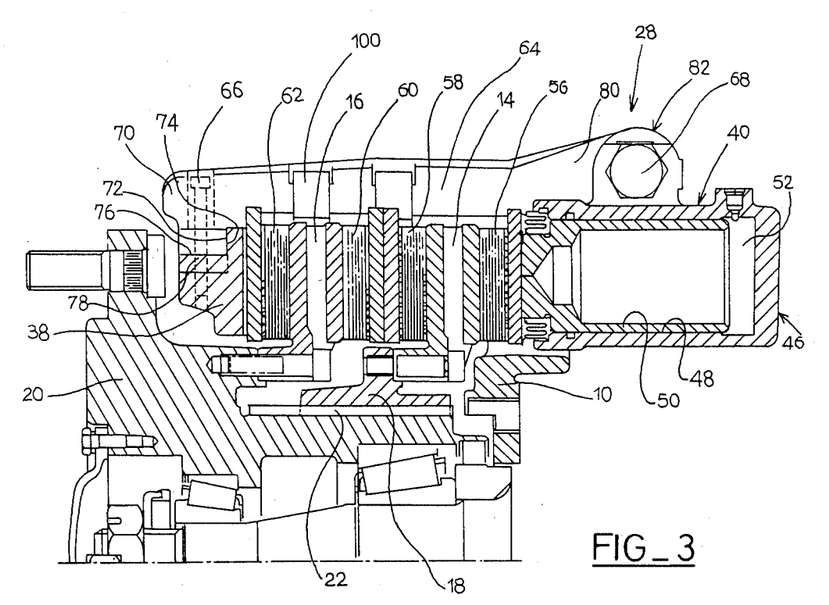
FIG. 3 is a sectional view along the line A—A shown in FIG. 1.
Figure 7:
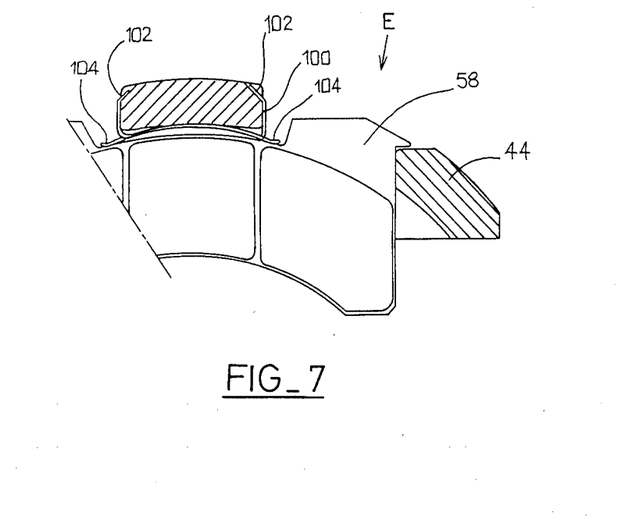
FIG. 7 is a partial view of a section along the line C—C shown in FIG. 2.

The disc brake shown in FIGS. 1 to 3 incorporates a fixed support 10 intended to be joined to a fixed portion of the vehicle (not shown) and consisting, in the embodiment shown, of a plate situated in the region of a rotating assembly 12 intended to be joined in rotation to a vehicle wheel (not shown). In the embodiment shown in FIGS. 1 to 3, the rotating assembly 12 consists of two discs 14 and 16 joined, respectively, to a sliding hub 18, and to a fixed hub 20, on which the hub 18 slides axially but is fixed to the latter in rotation by means of a system 22 whereby the two hubs 18 and 20 are keyed to one another. The fixed support 10 supports a movable caliper 28, so as to be capable of sliding, by means of two circumferentially spaced axial pillars 24 and 26, the caliper 28 being situated astride the rotating assembly to be braked. The axes of the pillars 24 and 26 are essentially parallel to the axis of rotation of the rotating assembly 12. As may be seen more clearly in FIG. 2, the pillars 24 and 26 are fixed relative to the support 10 and pass into bores 30 and 32 formed in arms 34 and 36, respectively, of the caliper 28. Referring to FIG. 2, it may be seen that the caliper 28 consists of two beams 38 and 40 positioned on each side of the rotating assembly 12 and joined by two circumferentially spaced arms 42 and 44, joining the two beams 38 and 40. In the embodiment shown, the caliper being able to slide, the beam 40 incorporates a twin brake actuator 46, each portion of which incorporates a bore 48 in which a piston 50 slides, forming a chamber 52 capable of being joined to a source of pressure such as a master cylinder (not shown). The two beams 38 and 40, together with the two arms 42 and 44, define a radial opening 54 in the caliper. As may be seen more particularly in FIGS. 2 and 3, the radial opening 54 allows the mounting of friction components 56, 58, 60 and 62 placed in this order on each side of the discs 14 and 16. The friction components 56 to 62 are supported so as to be anchored and to slide on the arms 42 and 44 as shown in FIG. 7.

Figure 8:
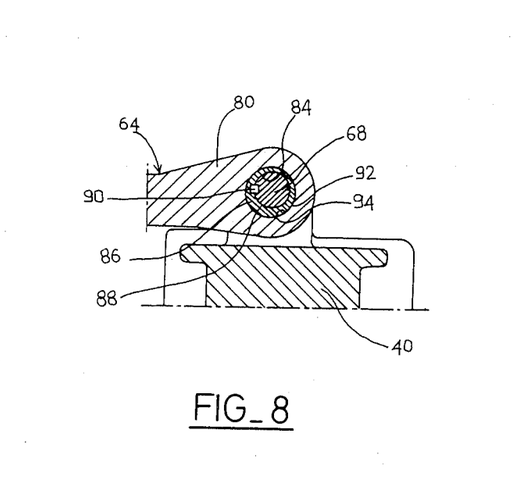
FIG. 8 is a partial view of a section along the line D—D shown in FIG. 2.

In accordance with the invention, the caliper 28 incorporates a third arm 64 positioned above the opening 54, rigidly fixed to the beams 38 and 40 by means of a screw 66 and a bolt 68, respectively. Referring to FIG. 3, it may be seen that the end 70 of the arm 64 incorporates a radial surface 72 bearing axially against a radial surface 74 provided in the beam 38. In the same way, the end 70 incorporates a tangential surface 76 bearing radially against a tangential surface 78 provided in the beam 38. The screw 66 and the surfaces 72 and 76 form a device for hooking the third arm 64 onto the beam 38. Referring to FIGS. 3 and 8, it may be seen that the arm 64 carries an adjustable device at its end 80, designated as an assembly by the reference 82 and consisting, in the embodiment shown, of an eccentric system formed by the bolt 68, which incorporates a cylindrical portion 84 on which is mounted a bush 86 having an eccentric bore 88, the bush 86 and the bolt 68 being firmly fixed to one another in rotation by means of a key 90 mounted in grooves formed opposite one another in the bolt 68 and in the bush 86. The bush 86 is mounted by its outer cylindrical surface 92 in a bore 94 formed in the end 80 of the arm 64, the bolt 68 being mounted by its cylindrical portion in the bores 96 formed in two arms 98 which are firmly fixed to the beam 40.

The brake which is described above with the aid of FIGS. 1, 2, 3, 7 and 8 is assembled in the following manner:

The caliper 28, without its central third arm 64, is first mounted on the fixed support 10 astride the two discs 14 and 16. The mounting of the friction components is next carried out. The opening 54 allows radial mounting of the friction components, in the direction of the arrow E shown in FIG. 7, the friction component 56 being positioned between the brake actuator 46 and the first disc 14. The friction components 58 and 60 are positioned next, again through the opening 54, between the two discs 14 and 16. The last friction component 62 is then positioned between the disc 16 and the beam 38. The arm 64, and more precisely its end 80 equipped with the bush 86, itself provided with the key 90, is then placed between the arms 98 of the beam 40. The mounting of the bolt 68 is next carried out by passing it through the bores 96 of the arms 98 taking care that the key 90 is correctly positioned in the groove of the bolt 68. When the bolt is correctly mounted, its nut is then mounted, without being tightened. The assembly of the arm 64 is then hinged so that the surface 76 carried at the end 70 comes to bear upon the surface 78 of the beam 38. By turning the head of the bolt 68 the bush 86 is turned which, owing to its eccentricity, causes the radial surface 72 of the end 70 of the arm 64 to come into contact against the radial surface 74 carried by the beam 38. When this contact is obtained, a slight additional torque is applied to the eccentric so as to ensure proper mating of the two radial surfaces. The screw 66 is next mounted, which locks the end 70 of the arm 64 in position relative to the beam 38. The end 80 of the arm 64 is then locked in this position, thus ensuring a rigid connection between the third arm and the beam 40; this is achieved by tightening the nut of the bolt 68 and immobilizing the bolt assembly in rotation by means of conventional locking devices.

When removal of the friction components is required, it is only necessary to slacken the bolt 68, to remove the screw 66, the arm 64 then being capable of hinging about the eccentric by its bore 92 about the cylindrical portion 94 of the bush 86, thus allowing access to the friction components 56 to 62.

Referring to FIGS. 2, 3 and 7 it may be seen that the arm 64 is provided wiht a pad spring 100 firmly fixed to the arm 64 by means of fingers 102 which are folded back, the spring 100 incorporating a second series of fingers 104 pushing the friction components radially inwards so as to ensure that they bear correctly on the arms 42 and 44. It is clear that, during the operation of mounting the arm 64, tightening the screw 66 provides the preload upon the spring 100, and thus upon the friction components.

Figure 4:
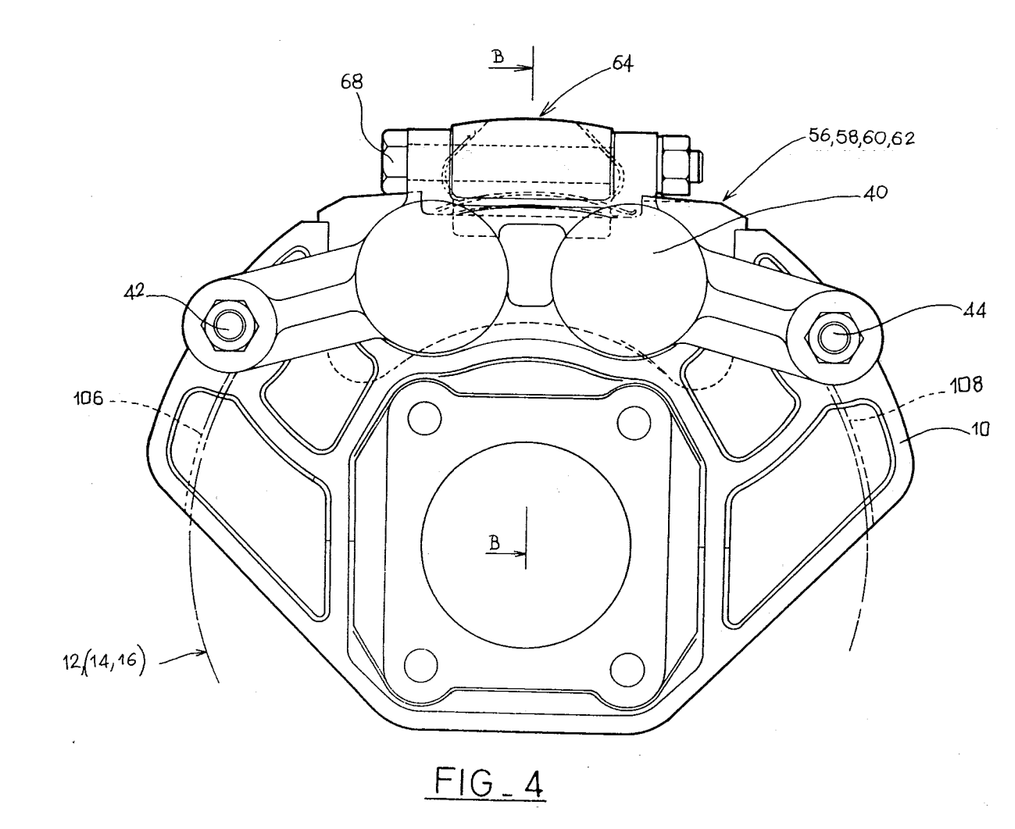
FIG. 4 is an end view of a disc brake constructed in accordance with a second embodiment of the invention.
Figure 5:
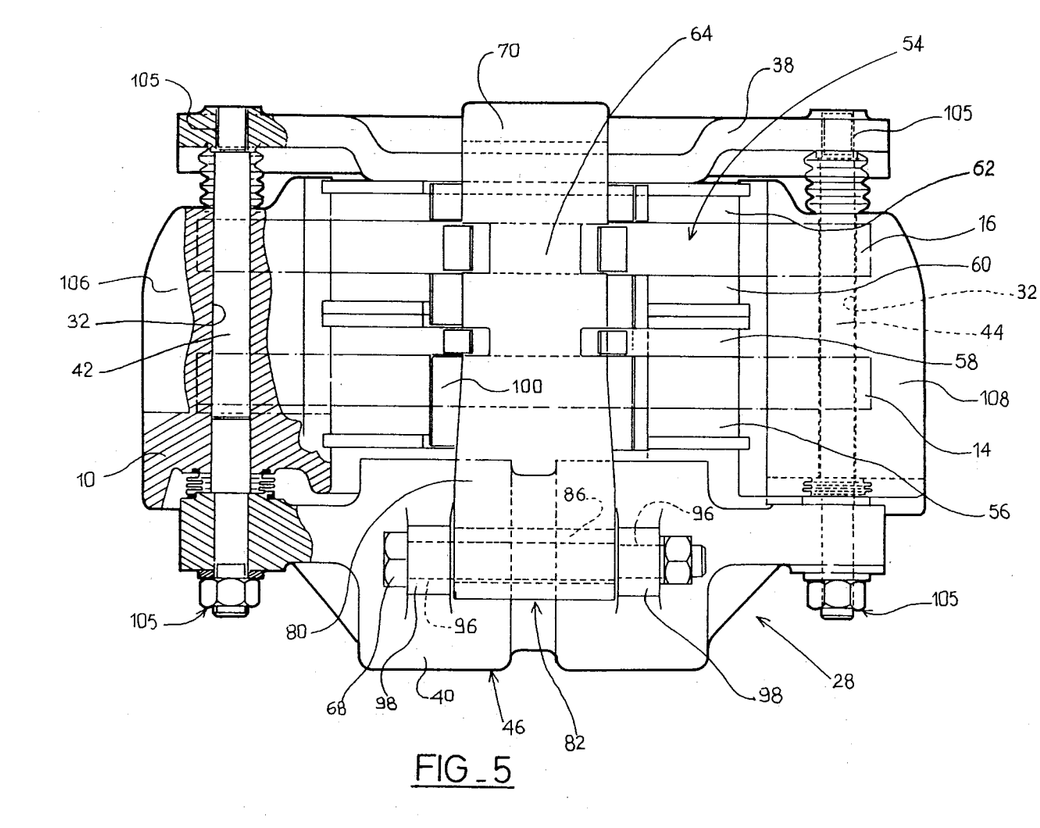
FIG. 5 is a plan view of the brake shown in FIG. 4.
Figure 6:
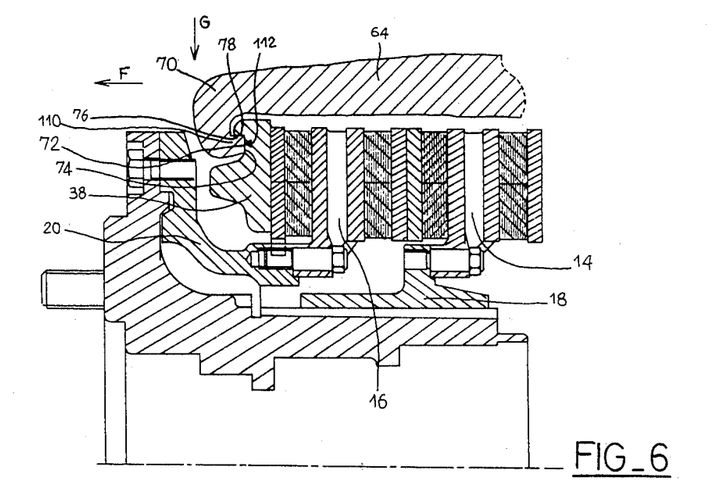
FIG. 6 is a partial view of a section along the line B—B shown in FIG. 4.

The embodiment shown in FIGS. 4, 5 and 6 is similar to the first embodiment. The components fulfilling similar functions carry the same reference numbers. In this second embodiment, the caliper 28 is formed by two beams 38 and 40 joined to one another by arms 42 and 44 formed by threaded rods, bolted on the one hand to the beam 38, and on the other hand to the beam 40, by means of threaded fixings 105. These arms 42 and 44 pass through bores 32 formed in portions 106 and 108 of the fixed support 10 passing over the periphery of the discs 14 and 16. The friction components 56, 58, 60 and 62 are housed so as to be anchored and to slide on the portions 106 and 108 in a manner similar to that shown in FIG. 7. The discs 14 and 16 with their hubs 18 and 20 form the rotating assembly to be braked 12.

In accordance with the invention, the second embodiment of the brake incorporates a third arm 64 passing over the opening 54 and rigidly joining the two beams 38 and 40. Referring to FIG. 6, it may be seen that the end 70 of the arm 64 incorporates a hooking device formed by a projecting portion 110 which penetrates a depression 112 formed in the beam 38. The projection 110 and the depression 112 each incorporate two orthogonal surfaces, one radial and one tangential, cooperating with one another, respectively. The other end 80 of the arm 64 incorporates an adjustable device 82 with an eccentric, similar to that shown in FIG. 8. In the same way, the arm 64 is provided with a spring 100 intended to push the friction components radially onto the portions 106 and 108 in a manner identical to that shown in FIG. 7.

The brake described above with the aid of FIGS. 4, 5 and 6 together with FIGS. 7 and 8 is assembled in the following manner:

The caliper 28 without its arm 64 is first assembled onto the fixed support 10. For this operation the beam 38 is first equipped with arms 42 and 44 by means of the threaded fixings 105 and provided with bellows for protecting the slides. The arms 42 and 44 are then mounted in the bores 32 formed in the portions 106 and 108 of the fixed support 10. The next operation is the mounting of the two other protective bellows, and the beam 40, carrying the brake actuators 46, is mounted on the arms 42 and 44. The assembly is tightened by means of nuts mounted on the threaded end portions 105 of the arms 42 and 44. The mounting of the friction components 56 to 62 is next carried out by introducing them radially as indicated by the arrow E shown in FIG. 7. When the friction components are bearing against the portions 106 and 108 of the fixed support 10, and correctly positioned relative to the discs 14 and 16, the arm 64 is then mounted. For this operation, and in a manner identical to that of the first embodiment, the arm 64 is first equipped with the bush 86, itself provided with the key 90. The bolt 68 is then introduced, taking care that its groove cooperates correctly with the key 90, the cylindrical portion of the bolt passing into the bores 96 of the arms 98 formed on the beam 40. The nut of the bolt 68 is next mounted, without tightening the latter. The end 70 of the arm 64 is then brought close to the beam 38. By turning the eccentric, by means of the bolt 68, the arm 64 is displaced, and more particularly its end 70 is displaced in the direction of the arrow F shown in FIG. 6 so that its projection 110 can be positioned in front of the depression 112 in the beam 38. The portion 70 is then lowered as indicated by the arrow G shown in FIG. 6 and the eccentric is turned in the opposite direction so as to bring back the end 70 of the arm 64 in the direction opposite to that of the arrow F, thus allowing it to enter the depression 112, so that the radial and tangential surfaces of the end 70, and of the beam 38, cooperate as shown in FIG. 6. Additional rotation of the bolt 68 ensures correct fixing of the arm 64 to the beam 38. After tightening the nut, the bolt and the nut 68 are immobilized in rotation in a conventional manner.

The removal of the arm 64 is carried out in the reverse order to that which is described above.

In the same way as for the first embodiment, the pad spring 100 is preloaded when the arm 64 is displaced in the direction of the arrow G shown in FIG. 6, before tightening the bolt 68.

Figure 9:
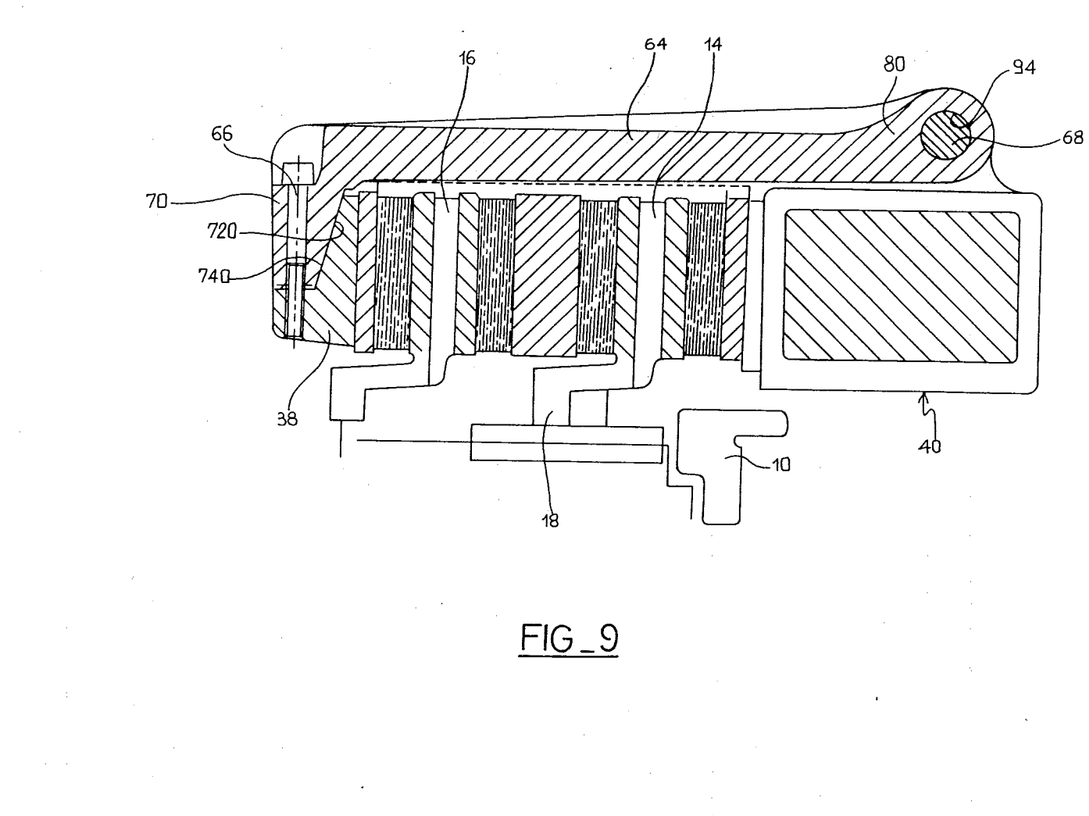
FIG. 9 is a view, similar to that shown in FIG. 3, showing another embodiment of the mounting, with recovery of the manufacturing tolerances, of the third arm onto the beams of the caliper.

FIG. 9 shows another system for recovering play, not employing an eccentric and applicable to the embodiment described above relating to FIGS. 1 to 3. The inner end 80 of the third arm 64 is mounted, in this case, so as to pivot directly on the bolt 68 (possibly with the interposition of a coaxial bush), and the outer end 70 of the third arm incorporates an inner bearing surface 720, lying at an angle of less than 90°, 80° for example, relative to the axis of the rotating assembly to be braked, and cooperating (possibly with the interposition of a wedge) with a corresponding ramp surface 740 inclined outwards and formed in the outer beam 38 of the caliper, these two surfaces being brought together so as to bear against one another by the radial screw 66, as in the embodiment shown in FIGS. 1 to 3, slight excess tightening of the screw 66 permitting an axial preload to be exerted on the caliper structure.

From the above description, it may be seen that the invention allows reinforcement of the two beams, and this irrespective of the manufacturing tolerances of the different components. It may also be seen that the invention allows effective reinforcement irrespective of the size of the opening intended for the removal of the friction components, and irrespective of the number of discs forming the rotating assembly to be braked. The removal of the friction components does not require the removal of the caliper, which may be heavy in the case of a multi-disc brake intended for heavy vehicles; only the hinging of the central arm is necessary.

The invention is not limited to the embodiments shown, and modifications may be made to them without departing from the scope of the present invention; in particular, the brake actuator 46 may be single or twin, and may be attached to the beam 40 and not constructed in one piece as shown. In the same way, the method of hooking the friction components, or the method of hooking the arm 64 onto the beam 38, may be modified without thereby departing from the scope of the invention. Lastly, the third arm may also be mounted so as to hinge on the outer beam 38 and be locked onto the inner beam 40.

We claim:

1. A disc brake, of the type incorporating a caliper astride a rotating assembly to be braked, the caliper being formed by two axially spaced-apart beams positioned axially on each side of the rotating assembly and by two circumferentially spaced-apart arms passing over the periphery of the rotating assembly and joining the two beams to one another, the two spaced-apart arms and the two axially spaced-apart beams defining a radial opening for mounting and removing friction components which cooperate with the rotating assembly to be braked, characterized in that the brake comprises a third caliper arm providing a rigid connection between the axially spaced-apart beams in order to strengthen the caliper, the third caliper arm lying above and extending over the opening and having one end pivotally mounted about a hinge shaft on one of the beams and the other end rigidly joined without play to the other beam, the brake having an eccentric system coaxial with the hinge shaft of the third arm, the hinge shaft formed by a bolt having a cylindrical shaft portion cooperating with a bore formed in the one beam, said cylindrical shaft portion including a longitudinal groove receiving a longitudinal key which fixes firmly in rotation thereto a cylindrical bush having a key-receiving groove in an eccentric bore in which the cylindrical shaft portion is disposed, the bush having an outer cylindrical surface disposed within a bore formed in the third arm so that rotation of the bolt and rotationally fixed bush causes said third arm to be displaced axially and provide said rigid connection.

2. The disc brake according to claim 1, characterized in that the third caliper arm includes at the other end opposite the hinge shaft an unlockable hooking device rigidly joining the third caliper arm to the other beam, the hooking device including an axial projection of the third caliper arm having a radial surface cooperating axially, when the eccentric system is operated, with a radial surface of a depression formed in the other beam and having a tangential surface cooperating with a tangential surface of the depression so as to prevent radial displacement of the other end from the other beam.

3. The disc brake according to claim 2, characterized in that the third caliper arm carries a pad spring biasing the friction components radially inwardly toward portions anchoring and sliding the components.

4. The disc brake according to claim 3, characterized in that the spaced-apart arms and beams comprise a single piece.

5. The disc brake according to claim 3, characterized in that the spaced-apart arms and beams are formed by separate components assembled together by threaded fixings.

6. The disc brake according to claim 3, characterized in that the caliper slides on a fixed support, one of the beams including a brake actuator that applies a friction component directly against a surface of the rotating assembly, and by reaction through the sliding caliper, the other beam applying another friction component against another surface of the rotating assembly.

7. The disc brake according to claim 1, characterized in that the other end includes an unlockable device rigidly joining the third caliper arm to the other beam, the unlockable device comprising radial and tangential surfaces on each of the other end and other beam that mate together and are locked in position by a threaded bolt received within a threaded opening disposed in one of the other end and the other beam, the bolt tightened after the eccentric system is operated.

* * * * *